US012657522B1

(12) United States Patent (10) Patent No.: US 12,657,522 B1

Aucagos (45) Date of Patent: Jun. 16, 2026

(54) METHODS AND SYSTEMS FOR AGENTIC RESPONSE GENERATION USING INFERRED INTENT

(71) Applicant: OneTake Pte Ltd, Singapore (SG)

(72) Inventor: Patrice Aucagos, Dubai (AE)

( * ) Notice: Subject to any disclaimer, the term of this patent is extended or adjusted under 35 U.S.C. 154(b) by 0 days.

(21) Appl. No.: 19/327,400

(22) Filed: Sep. 12, 2025

(51) Int. Cl.
*G06N 20/00* (2019.01)
*G06F 11/34* (2006.01)

(52) U.S. Cl.
CPC ......... *G06N 20/00* (2019.01); *G06F 11/3438* (2013.01)

(58) Field of Classification Search
None
See application file for complete search history.

(56) References Cited

U.S. PATENT DOCUMENTS

| | | | | |
|---|---|---|---|---|
| 2020/0392661 A1* | 12/2020 | Hatfield | ................. | D06F 34/18 |
| 2023/0342666 A1* | 10/2023 | Masson | ................. | G06N 3/084 |
| 2025/0356574 A1* | 11/2025 | Gojcic | ................. | G06T 17/20 |

* cited by examiner

*Primary Examiner* — David R Vincent

(74) *Attorney, Agent, or Firm* — Mertzlufft Law PLLC dba Stake; Joshua Mertzlufft

(57) ABSTRACT

A system may receive, at a processor, a user activity. A system may determine, by the processor, an inferred intent based on the user activity and user registry data provided from a database stored in a memory in electronic communication with the processor. A system may generate, by the processor, an implementation plan based on the inferred intent and including a task. A system may transmit, by the processor, an implementation plan status to a user device.

20 Claims, 6 Drawing Sheets

200

210

220

232    234    230

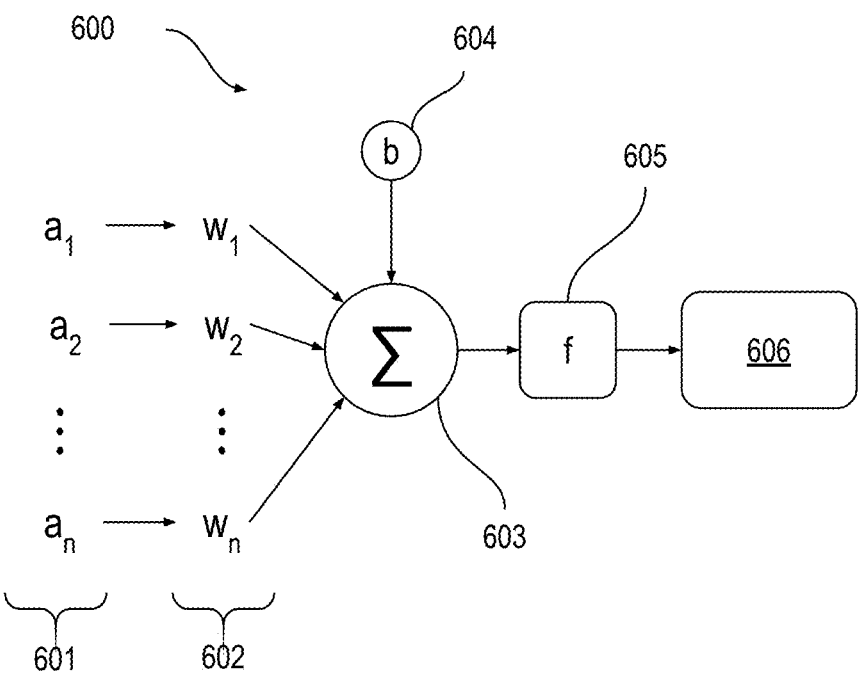
FIG. 6
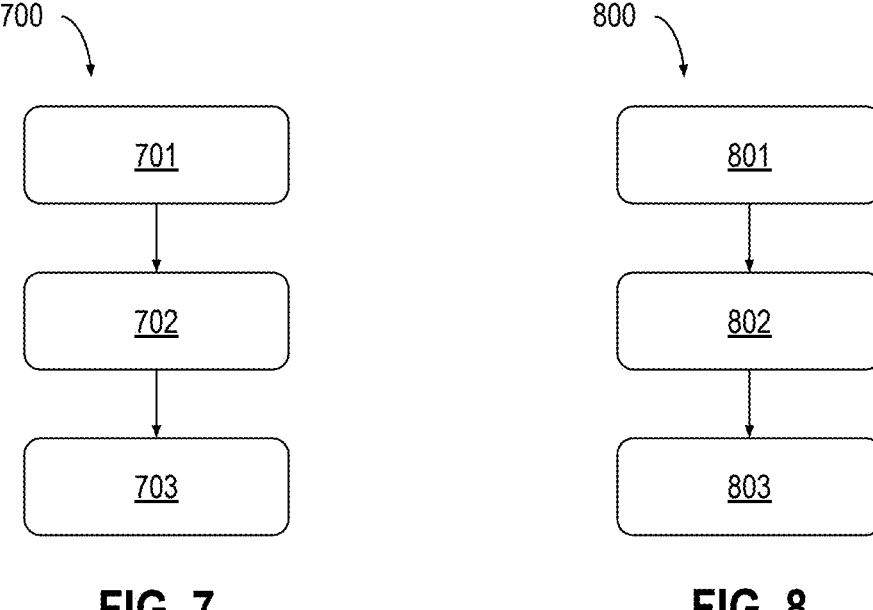
FIG. 7          FIG. 8

METHODS AND SYSTEMS FOR AGENTIC RESPONSE GENERATION USING INFERRED INTENT

BACKGROUND

The field of agentic artificial intelligence business systems has seen significant growth in recent years, driven by an increasing demand for automated and adaptive solutions in various commercial environments. Such systems often leverage advanced computational techniques to enable decision-making processes that may mimic human-like reasoning, thereby potentially enhancing operational efficiency across diverse industries. These technologies may be applied in areas such as customer relationship management, supply chain optimization, and predictive analytics, where the ability to process large volumes of data and respond dynamically to changing conditions is valuable.

SUMMARY

This Summary is intended to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

In some aspects, the techniques described herein relate to a method, including: receiving, at a processor, a user activity; determining, by the processor, an inferred intent based on the user activity and user registry data provided from a database stored in a memory in electronic communication with the processor; generating, by the processor, an implementation plan based on the inferred intent and including a task; and transmitting, by the processor, a status of the implementation plan to a user device. Either or both of the determining of the inferred intent and the generating the implementation plan may be performed in an asynchronous agentic phase. This agentic phase may proceed fully or partially asynchronous to the user activity. Either or both of the determining of the inferred intent or the generating the implementation plan may be temporally allocated by the processor based on a compute load. The compute load may correspond to current or historical computational usage or demand, or may be estimated or predicted, for example, based on system settings, current computational usage or demand, or historical computational usage or demand. The temporal allocation may allocate the inferring of the intent or all or some of the generating of the implementation plan to non-peak usage times to conserve and load-balance computational resources. The determining of the inferred intent may be by applying a trained machine learning model (e.g., an artificial neural network or a convolutional neural network). The user activity may include user activity data from a plurality of disparate sources, and may be a continuous stream of user activity data.

In some aspects, the techniques described herein relate to a method, wherein the user activity includes a user prompt, a user feedback, or a scheduled trigger.

In some aspects, the techniques described herein relate to a method, wherein receiving the user activity includes receiving a request from a distinct system.

In some aspects, the techniques described herein relate to a method, wherein the generating the inferred intent is using a trained machine learning model.

In some aspects, the techniques described herein relate to a method, further including: generating, by the processor, a research roadmap based on the inferred intent; and executing, by the processor, the research roadmap to yield a response; wherein the generating the implementation plan is further based on the response.

In some aspects, the techniques described herein relate to a method, wherein the generating the research roadmap is using a trained machine learning model.

In some aspects, the techniques described herein relate to a method, wherein executing the research roadmap includes retrieving website data from a website.

In some aspects, the techniques described herein relate to a method, wherein the generating the implementation plan is using a trained machine learning model.

In some aspects, the techniques described herein relate to a method, wherein the processor includes one or more physical processors, each of the one or more physical processors composing a computing platform.

In some aspects, the techniques described herein relate to a method, wherein the registry data includes a user name, a business name, an industry, a description of an ideal customer, a description of a product offering, a differentiation factor, a website link, a social media handle, a history of user activity, a history of user-stated intents, a history of inferred intents, a history of user feedback, a system setting, a system conversation history, an instruction or information proactively saved by the system as reference for future use, or an autonomy authorization level.

In some aspects, the techniques described herein relate to a method, wherein the implementation plan status includes a completion state of the implementation plan.

In some aspects, the techniques described herein relate to a method, wherein the transmitting the implementation plan status is via an electronic mail, a display corresponding to an application running on the user device, or a push notification.

In some aspects, the techniques described herein relate to a method, further including: receiving, at the processor, an instruction for the processor to perform the task; and performing, by the processor, the task.

In some aspects, the techniques described herein relate to a system, including: a processor of an application server; and a memory in electronic communication with the processor, the memory having a database stored thereon; wherein the processor is configured to: receive a user activity; determine an inferred intent based on the user activity and user registry data provided from the database; generate an implementation plan based on the inferred intent and including a task; and transmit a status of the implementation plan to a user device.

In some aspects, the techniques described herein relate to a system, wherein the generating the inferred intent is using a trained machine learning model.

In some aspects, the techniques described herein relate to a system, further including: generating, by the processor, a research roadmap based on the inferred intent; and executing, by the processor, the research roadmap to yield a response; wherein the generating the implementation plan is further based on the response.

In some aspects, the techniques described herein relate to a system, wherein the generating a research roadmap is using a trained machine learning model.

In some aspects, the techniques described herein relate to a system, wherein the generating the implementation plan is using a trained machine learning model.

In some aspects, the techniques described herein relate to a system, wherein the processor includes one or more physical processors, each of the one or more physical processors composing a computing platform.

In some aspects, the techniques described herein relate to a tangible, non-transitory, computer-readable medium having instructions thereupon which when implemented by a processor cause the processor to perform a method including: receiving, at the processor, a user activity; determining, by the processor, an inferred intent based on the user activity and user registry data provided from a database stored in a memory in electronic communication with the processor; generating, by the processor, an implementation plan based on the inferred intent and including a task; and transmitting, by the processor, a status of the implementation plan to a user device.

BRIEF DESCRIPTION OF THE FIGURES

For a fuller understanding of the nature and objects of the disclosure, reference should be made to the following detailed description taken in conjunction with the accompanying drawings, in which:

FIG. 6 illustrates a node, according to an implementation.

FIG. 7 illustrates a method of training a machine learning model of a machine learning module, according to one or more implementations herein.

FIG. 8 illustrates a method of analyzing input data using a machine learning module, according to one or more implementations herein.

DETAILED DESCRIPTION

Figure 1:
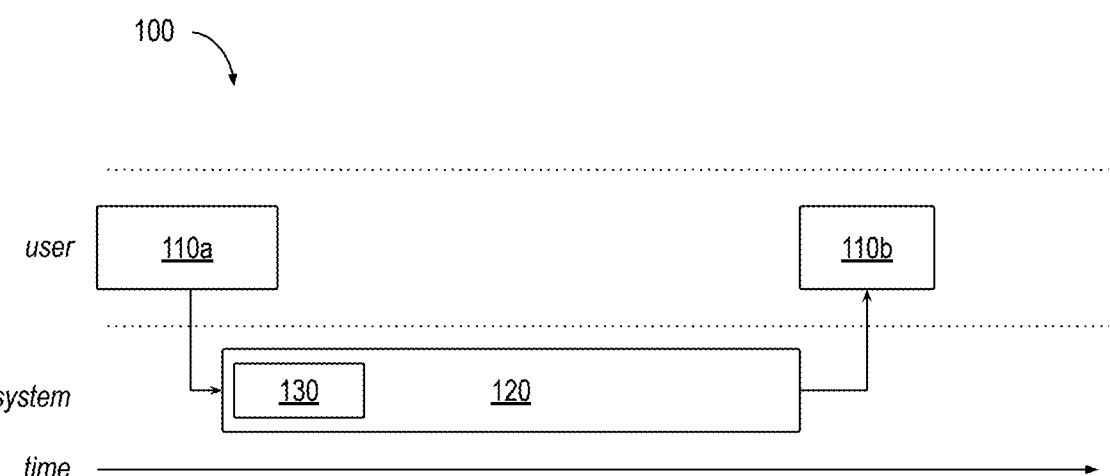
FIG. 1 illustrates a system, according to one or more implementations herein.

Implementations disclosed herein include a system implementing machine learning and large language models to provide responses to a user based on an inferred intent of the user as new events surface (either from a user chat session, a user session in the application, or from completely asynchronous triggers), utilizing data from a registry about the user or their business.

Implementations disclosed herein solve the problem of providing personalized and effective support to users beyond the explicit prompts or tasks they requested, based on an inferred intent of the user (e.g., an unstated intent).

Traditional methods of gathering user intent and preferences, such as surveys, questionnaires, and manual data collection, may not be sufficient or timely to address the true needs of users. In many situations, a user may insufficiently or be unable to express their intent of interacting with the system. These methods often rely on static data points that do not capture the full complexity of human communication, leading to a lack of understanding of the user's true intent and preferences. Moreover, these methods can be time-consuming and resource-intensive, requiring significant manual effort to collect and analyze user feedback.

The limitations of traditional methods are further exacerbated by the increasing amount of data available from various sources, including user feedback, website interactions, and other digital channels. This data can provide valuable insights into user behavior and preferences, but it is often fragmented and difficult to integrate into a cohesive understanding of the user's intent.

Implementations disclosed herein solve some or all of the aforementioned shortcomings. Implementations herein include methods and systems for receiving a user activity (e.g., user prompt, task request, scheduled run trigger (e.g., runs at a set time or interval), or on triggering by an external system (e.g., an API call, webhook call, or other HTTP request) from an external system), retrieving user registry data from a database, inferring an unstated intent to yield an inferred intent, generating an implementation plan using the user prompt and registry data, processing the implementation plan to yield a response, and transmitting the response to a user device. The method may further comprise retrieving additional data such as a user session history or website data, and may use this data in conjunction with the user prompt and registry data to determine an inferred intent and generate the implementation plan. The method may also include transmitting an electronic mail (email) or performing a task based on the generated response. One or more of the operations described herein may further implement a trained machine learning model, that is, inferring the unstated intent, generating the implementation plan, or the processing of the implementation plan may implement a trained machine learning model.

In an example, using an implementation, a user may interact with a chatbot interfacing with a system herein. The user may submit queries to the chatbot related to a particular location, for example, New York City. The system may, referencing these queries, the responses, the feedback on the queries, the follow-up queries, as well as internal registry data on the user (e.g., that the user has expressed sustained interest in New York City), infer an unstated intent of the user that the user is considering moving to New York City. The system may then, based on that inferred intent, consider that the registry data shows the user as owning a business and propose an implementation plan with tasks to move their business to New York. That implementation plan may consider legal news regarding updates to the New York Business Corporation Law, New York Tax Law news regarding markets, and current trends to provide a recommendation as to where to locate the business. Further tasks and recommendations may be formulated by the system related to the inferred intent as well. Certain of the tasks, for example, researching and contacting local real estate agents, business leaders, or attorneys may be performed in an agentic fashion by the system. All or some of such tasks may be allocated for execution by the system to optimize compute resource usage. Once the implementation plan is generated, the system may provide the user with updates as to an implementation status (e.g., its execution progress status and any tasks required of the user).

Implementations enable the inferring of intents, development of implementation plans, execution of tasks, and more asynchronously. This improves the functionality of agentic computing systems by enhancing an ability to temporally allocate computing resources (e.g., one or more of aspects of the method described herein may be run at a non-peak time, for example, overnight). This may reduce an aggregate need for computational resources and enable greater operational efficiency of computational resources (e.g., cloud computing, data centers, websites, and internet nodes and hubs).

An implementation plan may include a structured set of actions, recommendations, or strategies. In some implementations, the implementation plan may include an ordered sequence of executable instructions for retrieving and processing data from a plurality of external web sources and acting on it. The implementation plan may outline steps or objectives to be achieved in response to specific inputs or conditions. It may be generated or adapted dynamically based on available data or system goals, including from a system registry—containing registry data corresponding to the user—and an inferred intent. The implementation plan may guide the behavior or decision-making processes of automated components, for example, during asynchronous processing of the implementation plan or execution of a task of the response. Its complexity and scope may depend on the context or requirements of the system. Such plans may be revised or updated as new information becomes available (e.g., news breaks regarding an event, a sentiment, a market change, or policy change). An implementation plan status may be generated to represent a progress of execution of the implementation plan. The status may take various forms, including traditional progress metrics (e.g., percent complete, done-not-done etc.), tasks in progress, completed tasks, upcoming tasks, tasks needed to be performed offline by the user, or another representation of the status of the implementation plan. This status may be transmitted to a user device so that a user may be made aware of the progress of execution of the implementation plan by the system. The implementation plan status may include a starting breakpoint or intermittent break points where the user's approval may be sought or a permission check (e.g., spending allowances) may be completed.

The inferred intent may be determined by the system for use in developing the implementation plan. The inferred intent may be determined based on a variety of inputs including, for example, recent activity of a user, user registry data, unstructured user activity data (e.g., from a plurality of disparate sources (e.g., chat interfaces, web browsing history, API calls, etc.)), and external data (e.g., news data, economic data, policy data). The user activity may be discrete or may be a continuous stream. The inferred intent may be determined by applying a trained machine learning model (e.g., an ANN or CNN) to the user activity data and the user registry data.

Implementations may improve operational efficiencies of computer systems by efficiently allocating resources. Either or both of the determining of the inferred intent and the generating the implementation plan may be performed in an asynchronous agentic phase. The determining of the inferred intent may be deferred based on historical, current, expected, or predicted computing resource usage levels to load-balance the system (e.g., the determining of the inferred intent may be deferred until off-peak compute demand times). Similarly, the implementation plan may further include timings of tasks, recommendations, or strategies coordinated with historical, current, expected, or predicted computing resource usage levels (e.g., of system-wide computing resource utilization or external web resource utilization) to load-balance the system (e.g., certain aspects of the implementation plan may be deferred until off-peak compute demand times). This temporal optimization may be further based on temporally-variable cost external resources the system is configured to interface with and use in execution of the implementation plan. In this way, compute processor time and memory may be optimized while still providing agentic functionality to the user. In other words, the determining of the inferred intent and the generating of the implementation plan may be temporally allocated by the processor to non-peak usage times to conserve and load-balance computational resources.

The implementation plan may be generated using a research roadmap. The research roadmap may be determined by using the inferred intent to generate a series of steps needed to gather information. Such information gathering may include, for example, conducting a web search, reading user registry data, analyzing user-provided files, generating text, generating media files, generating documents, and interfacing with other systems. The research roadmap may then be executed by the system to generate the implementation plan.

The implementation plan may then be proposed for implementation. The implementation plan may include a series of steps or tasks that may be executed by the system to fulfill the inferred intent. In some implementations, the system may execute the implementation plan, execute the implementation plan only if it is within a parameter or limit set by the user, or await approval for execution by the user. Certain aspects of the implementation plan may require actions external to the system (e.g., submission of a government form by a user), in which cases, the implementation plan may include instructions or guidance to the user to take such action. Other actions of the implementation plan may be configured to await confirmation from the user that such an action has been taken.

The generating of the implementation plan may further utilize feedback received during the user session (e.g., positive or negative feedback on in-session responses). Additionally, the method may retrieve a user session history from memory, which is used in conjunction with the user prompt to generate the plan. The user session history may include user feedback on previous responses or user feedback on a previous implementation plan. Furthermore, the method may incorporate website data retrieved from the internet into the generation of the implementation plan.

The registry data used in this method may include various pieces of information such as a user name, business name, industry, descriptions of ideal customers and product offerings, differentiation factors, website links, or social media handles. The registry data may also include histories of user-stated intents, feedback, or inferred intents. The transmitting of the response to the user device may involve sending an email or other notification.

The method may further comprise receiving an instruction for the processor to perform a proposed task and performing the task. The task may include one or more activities or objectives that may be assigned or managed within a system related to agentic artificial intelligence business systems. This activity may involve a set of actions or processes to achieve a defined outcome. It may be initiated by a user, system, or automated agent. The task may vary in scope, duration, or complexity based on the context. Its progress or completion may be tracked or reported within the system. Such activities may contribute to broader goals or operations of the user or the user's business.

FIG. 1 illustrates a system 100, according to one or more implementations herein. The system 100 may receive user activity (e.g., prompts, queries, uploads, HTTP requests (e.g., API calls) etc.), retrieve relevant registry data from a database, determine an inferred intent of the user, generate an implementation plan using the inferred intent, process the implementation plan, and transmit the response to a user device. Various steps may be implemented using one or more trained machine learning models.

In an initial user activity 110a, a user may interact within a chat or other context with an artificial intelligence model (for example, using a prompt-response methodology). Alternatively, the initial user activity 110a may include a task request, scheduled run trigger (e.g., runs at a set time or interval), or a triggering by an external system (e.g., an API call, webhook call, or other HTTP request from an external system). For example, where the user activity 110*a* includes a scheduled run trigger, the system 100 may be triggered to operate as described herein on an interval, at set times, or in another scheduled manner by the user. Furthermore, where the user activity 110*a* includes triggering by an external system, the external system, such as running code or an automation tool (e.g., ZAPIER®, MAKE®, or the like) may send a request (e.g., an HTTP request) to the system to begin operation. Such a triggered initial user activity 110*a* may occur without distinct, synchronous, or concurrent interaction with the system 100 by the user.

During or following the initial user activity 110*a*, the user's prompts, request content, or any other aspect of the initial user activity 110*a* may be transmitted to the system for development of an agentic plan during an agentic phase 120. The agentic phase 120 may be asynchronous or semi-synchronous to a user session (e.g., start while a user is actively interfacing with the system). The agentic phase 120 may involve information from the initial user activity 110*a*, as well as registry data 130 corresponding to the user. All or part of the agentic phase may be allocated by the processor or a further processor based on current, historical, scheduled, or predicted computing resource demand.

For instance, if a user provides negative feedback on a previous response, the system may adjust the plan to avoid similar mistakes in the future. The system may also retrieve a user session history, which includes information about previous interactions with the system, such as responses and feedback. This data may be used to improve the implementation plan by taking into account the user's preferences and behavior.

The registry data 130 used by the system may include various pieces of information, such as a user's name, business name, industry, ideal customer description, product offering details, differentiation factor, website link, or social media handles, names or characteristics (e.g., birthdays or other important dates) of people or business relevant to the user or the user's business, personal preference, writing styles, settings related to the system (e.g., a level of authorized autonomy of the system, application settings, style settings, formality settings, scheduling settings, etc.), system conversation history, usage history, and user feedback history (whether explicit (e.g., the user provided direct feedback on a response) or implicit (e.g., the user decided to execute a proposed task). The system may further add additional information or types of information to the registry, for example, the system may store an instruction or bias to weigh against a future suggestion if the user has previously declined previous suggestions positively correlated to that suggestion. This data may be used to generate a comprehensive understanding of the user's needs and preferences. The system may also retrieve website data from the internet, including news information, which may be relevant to the user's interests. These data may be collected from a user by manual input, inferred from a user's chat history, or retrieved from the internet. These data may further include system data (e.g., trends across multiple users, whether in total or segmented, and other aggregated data, which may be anonymized).

Using any data received from the initial user activity 110*a* and the registry data 130, in the agentic phase 120, the system may generate an inferred intent as described herein. Using this inferred intent, the system may generate and execute a research roadmap. Whether or not a research roadmap is generated or executed, the system may then generate an implementation plan during the agentic phase 120 that addresses the user's unstated, but inferred intent. The response may include tasks to be performed by the system, such as preparing a marketing campaign, coding a feature, or preparing an informational brief or memorandum. The system may self-iterate the tasks that may be performed, that is, tasks may further include, for example, making changes or improvements to the outputs of tasks already performed synchronously or scheduled for, with, or by the user, (e.g., proposing additional edits to a video that was already edited during a user session). Tasks may further include suggested courses of action for a user to take to accomplish the inferred intent. For example, if the inferred intent is that the user desires to move to New York City, a task may include steps to incorporate and move their business to the state of New York.

A user may set preferences controlling whether and how much of the task the system can perform autonomously without specific user permission. In this example implementation, the system may receive an instruction from the processor to perform the proposed task and perform the action accordingly. The response may then be returned to the user, for example, in a further user session 110*b*.

Where multiple tasks are candidates for inclusion in the response, the tasks may be scored by the system in the agentic phase 120 to determine a priority of tasks. If certain tasks require the use of a tool or platform requiring some form of payment, the system may factor such aspects into the prioritization. In some embodiments, the system may be limited or restricted altogether from performing tasks that require a loss or spend by the user.

Some tasks may be considered destructive if their execution carries a meaningful cost or potential for meaningful impact to the user. Examples of destructive tasks may include deletion of a file (e.g., deletion of a video file), changing of a file, initiating an advertising campaign, sharing a social media post, spending of money, tokens, or credits, allocating processing resources (e.g., that would otherwise be used for the user's synchronous session thus costing speed of the user's synchronous session), actions involving a conflict of interest (e.g., the use of system credits), or other actions carrying a meaningful cost to the user. Such destructive tasks may be pre-authorized, or held for authorization by the user. A user may set particular cost thresholds (e.g., money, tokens, computing resources) within which the system may execute without approval.

By determining an inferred intent and generating the implementation plan, the system 100 may conserve and schedule computing resources for execution so that a system may handle more data, and produce more accurate results.

A component may include, and implementations herein may be implemented using, hardware, firmware, software, or a combination thereof. The actual control hardware or software code used to implement these systems or methods is not limited to the implementations described herein. Thus, the operation and behavior of the systems or methods are described herein without reference to specific software code—it being understood that software and hardware can be used to implement the systems or methods based on the description herein.

A computing device may include one or more of, for example, a server, a desktop computer, a notebook computer, a handheld computer, a tablet computer, a smartphone, a non-smartphone, a wearable device, or other computing platform. A computing device may include, for example, a processor, a memory, a power supply, or a network interface.

Unless clearly stated or context necessitates otherwise, a computing device herein may refer to one or more computing devices acting in synchronously or asynchronously to provide the functionality attributed herein to the computing device, for example, according to a parallel architecture, a distributed architecture, a client-server architecture, a cloud architecture, a peer-to-peer architecture, or other architecture, which may include a plurality of hardware, software, or firmware components operating together.

A processor may include or be implemented as one or more of, for example, a central processing unit, an arithmetic logic unit, a graphics processing unit, a microprocessor, a controller, a microcontroller, a digital signal processor, a field-programmable gate array (FPGA), an application-specific integrated circuit (ASIC), or another type of processing component. A processor may be implemented in hardware, firmware, or a combination of hardware and software. A processor may be configured to execute machine-readable instructions for implementing all or some of the implementations herein via circuitry, hardware, storage media, or any other components. A processor may be configured to access, read, retrieve data from, write to, manipulate, or otherwise control a memory. A processor may be configured to execute one or more modules by software, hardware, firmware, other mechanisms for configuring processing capabilities of the processor, or a combination thereof.

A processor may be implemented as a single processor or multiple processors. Unless clearly stated or context necessitates otherwise, a processor herein may refer to one or more processors capable of being programmed to perform a function. Such processors may or may not be all integral to the same physical device and may in some implementations be distributed among several devices.

A module may refer to any component or set of components that perform the functionality attributed to the module. Modules may be implemented using a processor, a memory, or other components of a computing device. Modules or portions thereof may be implemented in any of various ways, including procedure-based techniques, component-based techniques, or object-oriented techniques, among others. For example, the program instructions may be implemented using system libraries, language libraries, model-view-controller (MVC) principles, application programming interfaces (APIs), large language models (LLMs), system-specific programming languages and principles, cross-platform programming languages and principles, pre-compiled programming languages, markup programming languages, stylesheet languages, "bytecode" programming languages, object-oriented programming principles or languages, other programming principles or languages, C, C++, C#, Java, JavaScript, Python, PHP, HTML, CSS, TypeScript, R, Elm, Unity, VB.Net, Visual Basic, Swift, Objective-C, Perl, Ruby, Go, SQL, Haskell, Scala, Arduino, assembly language, Microsoft Foundation Classes (MFC), Streaming SIMD Extension (SSE), or other technologies or methodologies, as desired. Descriptions of the functionality provided by modules herein are for illustrative purposes, and are not intended to be limiting, as any of modules described herein may provide more or less functionality than is described.

A memory may include one or more of, for example, a random-access memory, a read only memory, or another type of memory (e.g., a flash memory, a cache memory, a magnetic memory, or an optical memory). For example, a memory may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically readable storage media implemented as, for example, a solid-state disk drive, a hard disk drive, a magnetic disk drive, an optical disk drive, a compact disc, a digital versatile disc, or another type of non-transitory computer-readable medium. A memory may be implemented as a non-transitory (e.g., the medium itself (i.e., tangible, not a signal) as opposed to a limitation on data storage persistency (e.g., RAM vs. ROM)), computer-readable storage medium.

A memory may be integral (i.e., substantially non-removable) or removably connectable (e.g., a serial port, a USB port, an IEEE 1394 port, a THUNDERBOLT™ port, disk drive, flash drive, or solid-state drive etc.) to a computing device. A memory may alternatively include one or more virtual storage resources (e.g., cloud storage, a virtual private network, or other virtual storage resources). A memory may store, electronically, magnetically, optically, or mechanically, software algorithms, information determined by one or more processors, information received from one or more computing platforms, information received from one or more remote platforms, databases (e.g., structured query language (SQL) databases (e.g., MYSQL®, MARIADB®, MONGODB®, POSTGRESQL®), NO-SQL databases, among others), data files, compiled data, analyzed data, charts, tables, videos, images, presentations, and 3D content in the respective format or other information enabling a computing device or processor thereof to function as described herein.

A memory may be implemented as a single memory or multiple memories. Unless clearly stated or context necessitates otherwise, a memory herein may refer to one or more memories capable of storing data. Such memories may or may not be all integral to the same physical device and may in some implementations be distributed among several devices. As such, a memory may include memory space within a single physical storage device or memory space spread across multiple physical storage devices.

A network may include any variety of devices configured to enable wired or wireless communication between devices or components thereof, for example, via the internet or other networks using, for example, TCP/IP hardware, cellular hardware, or other hardware configured for wired or wireless communication. A network may be implemented, for example, using a receiver, a transmitter, a transceiver, a modem, a network interface card, or an antenna.

Wired communication may include one or more of, for example, a wire, a cable, or a circuit trace implemented as, for example, a bus, a circuit connection, a coaxial connection, a serial connection, a parallel connection, a universal serial bus (USB) connection, a computer network (e.g., CAT-5 or ethernet) connection, an IEEE 1394 connection, a THUNDERBOLT™ connection, or another wired connection.

Wireless communication may include one or more of, for example, cellular, 2G, 3G, 4G, 4G LTE, 5G, 6G, wireless local area network, near field communication (NFC), or BLUETOOTH® communication.

Figure 2:
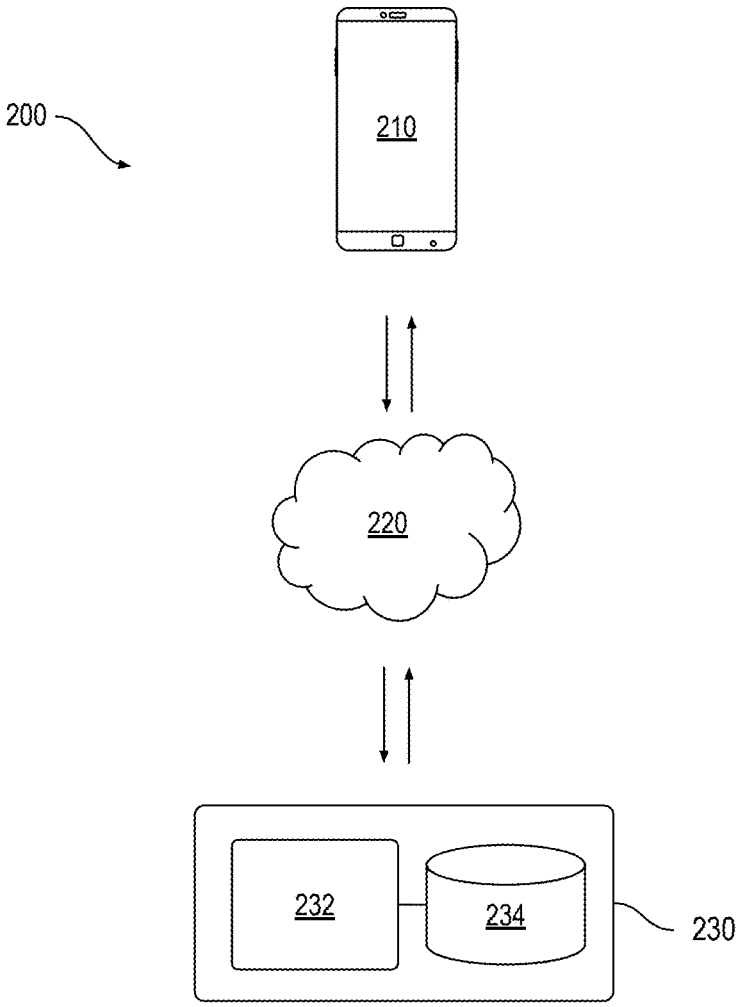
FIG. 2 illustrates an operational environment, according to one or more of the implementations herein.

FIG. 2 illustrates an operational environment 200, according to one or more of the implementations herein. As illustrated in FIG. 2, the operational environment 200 may include a device 210 and a device 230, which may communicate via a network 220.

The device 210 may include a computing device a user may use to interface with the device 230 via the network 220.

The device 230 may include a computing device including, for example, a processor 232, and a memory 234.

The processor 232 may perform a method comprising receiving a user prompt during a user session, inferring an unstated user intent, retrieving user registry data from a database, generating an implementation plan using the user prompt and registry data, processing the plan using a trained machine learning model to yield a response, and transmitting the response to a user device. The method may further comprise retrieving additional data such as a user session history, website data, or other external data, and may use this data in conjunction with the user prompt and registry data to generate the implementation plan. The method may also include transmitting an electronic mail (email), a notification (e.g., a push notification), or performing a task based on the generated response. It will be understood that various of the operations described herein as performed by a processor or another component may be performed within the same system, or across distinct systems. For example, a processor of one system may query additional data from a database, the internet, or another system for use in creating the research roadmap or the implementation plan. Additionally, a processor of one system may interface with another system to implement one or more of the authorized tasks of the research roadmap or the implementation plan.

Figure 3:
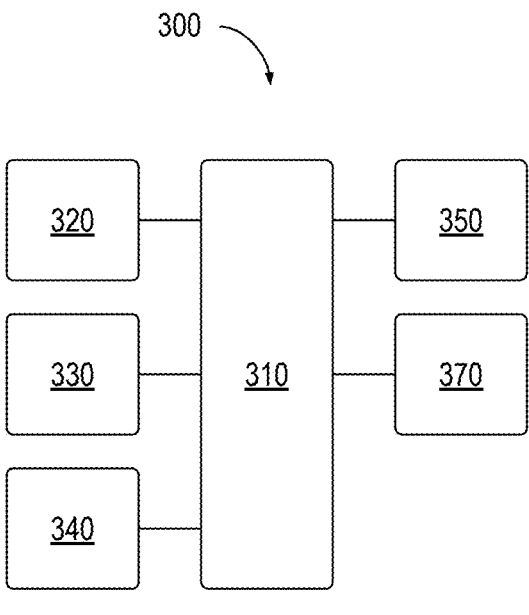
FIG. 3 is a diagram of example components of a computing device, according to one or more implementations herein.

FIG. 3 is a diagram of example components of a computing device 300, according to one or more implementations herein. The computing device 300 may correspond to one or more devices, networks, resources, or services, or a component thereof, of FIG. 2. The device 300 may include a bus 310, a processor 320, a memory 330, an input component 340, an output component 350, and a communication component 370.

The bus 310 includes a component that enables wired or wireless communication among the components of device 300, allowing for the transfer of data from one component to another.

The processor 320 may be configured to communicate, receive input from, direct output to, or otherwise interact with the memory 330, the input component 340, the output component 350, and the communication component 370.

The memory 330 may be configured to store data or instructions for execution by the processor 320. In some implementations, the memory 330 is integral to the processor 320.

The input component 340 may enable the device 300 to receive input, such as user input or sensed inputs. The input component 340 may represent one or more physical input components. For example, an input component 340 may include one or more of a touch screen, a keyboard, a keypad, a mouse, a button, a microphone, a camera, a switch, a sensor (internal or external), a global positioning system component, an accelerometer, a gyroscope, or an actuator.

The output component 350 may enable the device 300 to provide output, such as via a display, a speaker, or one or more light-emitting diodes. A display may be configured to display an interface of an application, which may be enabled to provide for user interaction as well as showing information such as an implementation plan or an implementation plan status.

The communication component 370 may enable the device 300 to communicate with other devices, such as via wired communication or wireless communication (e.g., via a network).

The device 300 may perform one or more processes described herein. For example, a non-transitory computer-readable medium (e.g., the memory 330) may store a set of instructions (e.g., one or more instructions, code, software code, or program code) for execution by the processor 320. The processor 320 may execute the set of instructions to perform one or more processes described herein. In some implementations, execution of the set of instructions, by one or more processors delineated by the processor 320, causes a performance of one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

In addition to the example configuration described herein in FIG. 3, various steps, functions, or operations of the device 300 and the methods disclosed herein may be carried out by one or more of, for example, electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random-access memory, a magnetic or optical disk, a non-volatile memory, a solid-state memory, a magnetic tape, and the like. A carrier medium may include a transmission medium such as a wire, cable, or wireless transmission link.

The following figures illustrate example methods and operations thereof. In some implementations, a method illustrated herein may include additional operations, fewer operations, differently arranged operations, or different operations than the operations depicted in the following figures. Moreover, or in the alternative, two or more of the operations depicted in the following figures may be performed at least partially in parallel.

In implementations of the methods illustrated in the following figures, various operations may be performed by one or more hardware processors configured by machine-readable instructions (e.g., instructions stored electronically on an electronic storage medium), which may include a module in accordance with one or more embodiments. Such a hardware processor may include one or more processing devices (e.g., one or more digital processors, analog processors, digital circuits designed to process information, analog circuits designed to process information, state machines, and/or other mechanisms for electronically processing information). The one or more processing devices may include one or more devices configured through hardware, firmware, and/or software, which may be specifically designed for execution of one or more of the operations of methods illustrated herein.

Figure 4:
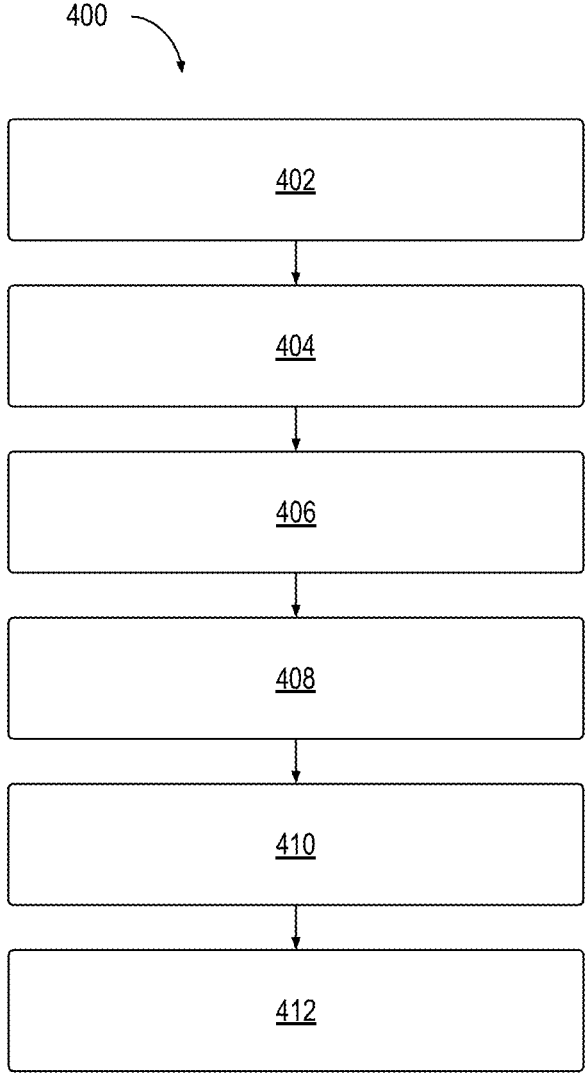
FIG. 4 is a flowchart illustrating an example method, according to one or more implementations herein.

FIG. 4 is a flowchart illustrating an example method 400, according to one or more implementations herein. In some implementations, one or more operations illustrated in FIG. 4 may be performed by one or more of the devices or components depicted in FIG. 1 through FIG. 3, in concert, in the alternative, or in combinations thereof. In some implementations, one or more operations may be performed by another device, system, or group of devices or systems separate from or including these. Additionally, or alternatively other devices, components, or systems, may be employed to perform the operations.

An operation 402 may include receiving, at a processor, a user activity, and may be performed alone or in combination with one or more other operations depicted in FIG. 4. The user activity may include a variety of user activities, including a chat prompt, a feedback, a scheduled trigger, or an external request.

An operation 404 may include retrieving, by the processor, from a database stored in a memory in electronic communication with the processor, user registry data, and may be performed alone or in combination with one or more other operations depicted in FIG. 4. The registry data may include a user name, a business name, an industry, a detailed description of an ideal customer, a detailed description of a product offering, a differentiation factor, a website link, one or more social media handles, a history of user activity, a history of user-stated intents, a history of user feedback, or a history of inferred intents, a history of user feedback, a system setting, a system conversation history, an instruction or information proactively saved by the system as reference for future use, or an autonomy authorization level.

An operation 406 may include generating an inferred intent of the user, and may be performed alone or in combination with one or more other operations depicted in FIG. 4. The inferred intent may be generated based on the user activity and the registry data, but may be unconstrained by the user activity. For example, if a user is searching for information regarding apartments in New York City, an inferred intent may include that the user desires to move their business to New York City. The inferred intent may be generated using a trained machine learning model.

An operation 408 may include generating a research roadmap based on the user activity and the inferred intent, and may be performed alone or in combination with one or more other operations depicted in FIG. 4. The research roadmap may then be executed to generate a response. The research roadmap may be generated or executed using a trained machine learning model.

An operation 410 may include generating an implementation plan based on the user activity, the inferred intent, or the response, and may be performed alone or in combination with one or more other operations depicted in FIG. 4. The implementation plan may include one or more tasks, which may be pre-authorized or in need of authorization by a user and may be performable by the local system either alone or in concert with other external resources. The implementation plan may be unconstrained by the user activity.

An operation 412 may include transmitting, by the processor, a status of the implementation plan to a user device (e.g., via email or in-app), and may be performed alone or in combination with one or more other operations depicted in FIG. 4. A status may include whether or how much of the implementation plan has been executed autonomously, whether an approval is needed, or whether the implementation plan is awaiting the user's performance of a task.

Implementations may implement machine learning, a type of artificial intelligence (AI) that provides computers with an ability to learn how to process data without being explicitly programmed. Machine learning focuses on the development of computer programs that can teach themselves to grow and change when exposed to new data. Machine learning explores the study and construction of algorithms that can learn from and make predictions based on data. Such algorithms may overcome following strictly static program instructions by making data-driven predictions or decisions, through building a model from sample inputs.

Machine learning may refer to a variety of AI software algorithms, which may be used to perform supervised learning, unsupervised learning, reinforcement learning, deep learning, or any combination thereof. A variety of different machine learning algorithms may be employed in implementations. Examples of machine learning algorithms may include, inter alia, artificial neural network algorithms, Gaussian process regression algorithms, fuzzy logic-based algorithms, or decision tree algorithms.

In some implementations, more than one machine learning algorithm may be employed. For example, automated classification may be implemented using one type of machine learning algorithm, and adaptive real-time process control may be implemented using a different type of machine learning algorithm. In some implementations, hybrid machine learning algorithms including features and properties drawn from two, three, four, five, or more different types of machine learning algorithms may be employed.

Supervised learning algorithms may use labeled training data to infer a relationship between one or more identifiable aspects of a given entity and a classification of the entity according to a specified set of criteria or to infer a relationship between input process control parameters and desired outcomes. The training data may include paired training examples. For example, each training data example may include aspects identified for a given entity and the resultant classification of the given entity. As a further example, each training data example may include process control parameters used in a process and a known outcome of the process.

Unsupervised learning algorithms may be used to draw inferences from training data including entity data not paired with labeled entity classification data, or input process control parameter data not paired with labeled process outcomes. An example of an unsupervised learning algorithm is cluster analysis, which may be used for exploratory data analysis to find hidden patterns or groupings in process data.

Semi-supervised learning algorithms may use both labeled and unlabeled object classification or process data for training. Semi-supervised learning algorithms may typically use a small amount of labeled data with a large amount of unlabeled data.

Reinforcement learning algorithms may be used, for example, to optimize a process (e.g., steps or actions of the process) to maximize a process reward function or minimize a process loss function. In machine learning environments, reinforcement learning algorithms may be formulated as Markov decision processes. Reward functions or loss functions, which may also be referred to as cost functions or error functions, may map values of one or more process variables and/or outcomes to a real number that represents a reward or cost, respectively, associated with a given process outcome or event. Examples of process parameters and process outcomes include, inter alia, process throughput, process yield, production quality, or production cost. In some cases, the definition of the reward or loss function to be maximized or minimized, respectively, may depend on the choice of machine learning algorithm used to run the process control method, or vice versa. For example, if an objective is to maximize a total reward/value function, a reinforcement learning algorithm may be chosen. If the objective is to minimize a mean squared error loss function, a decision tree regression algorithm or linear regression algorithm may be chosen. In general, the machine learning algorithm used to run the process control method will seek to optimize the reward function or minimize the loss function by identifying the current state of the process; comparing the current state to the reference state, which may be a target intermediate or final state; and adjusting one or more process control parameters to minimize a difference between the two states. This adjustment may include reference to past learning provided by a training data set. Reinforcement learning algorithms differ from supervised learning algorithms in that correct training data input/output pairs are not presented, nor are sub-optimal actions explicitly corrected. Implementations of these algorithms tend to focus on real-time performance by finding a balance between exploration of possible outcomes based on updated input data and exploitation of past training.

Deep learning, which may also be known as deep structured learning, hierarchical learning, or deep machine learning, may be based on a set of algorithms that attempt to model high level abstractions in data. Deep learning algorithms may be inspired by the structure and function of the human brain and are part of a broader family of machine learning methods based on learning representations of data. Rooted in neural network technology, deep learning may involve a probabilistic graph model having many neuron layers, commonly known as a deep architecture. Deep learning technology may process information such as, inter alia, image, text, or sound information in a hierarchical manner. An observation (e.g., a feature to be extracted for reference) can be represented in many ways including, for example, a vector of intensity values, a set of edges, regions of shape, or in another abstract manner. Some representations may simplify the learning task (e.g., face recognition or facial expression recognition). Deep learning can provide efficient algorithms for unsupervised or semi-supervised feature learning and hierarchical feature extraction. Implementations employing deep learning can further benefit from the advantage of deep learning concepts in solving a normally intractable representation inversion problem.

A deep learning module may be configured as a neural network. The deep learning module may further be a deep neural network with a set of weights that model the world based on training using training data. Neural networks can be understood to implement a computational approach-based on a relatively large collection of neural units-to loosely model the way a human brain solves problems with large clusters of biological neurons connected by axons. Each neural unit may be connected to one or more others, and links can be enforcing or inhibitory in their effect on the activation state of connected neural units. These systems may be self-learning and trained rather than explicitly programmed. Neural network systems excel in areas where a solution or feature detection is difficult to express in a traditional computer program.

An example of a deep learning algorithm may be an artificial neural network (ANN). Large ANNs including many layers may be used, for example, to map entity data to entity classification decisions or to map input process control parameters to desired process outcomes. ANNs will be discussed in further detail below.

Neural networks typically include multiple layers, and the signal path may traverse from front to back. The goal of neural networks may be to solve problems in a similar manner to the human brain, although several neural networks may be much more abstract. In a simple example of a neural network, there may be two layers (i.e., sets) of neurons: an input layer that receives an input signal and an output layer that sends an output signal. When the input layer receives an input, it may pass a modified version of the input to the next layer. In a deep network, there may be many layers between the input layer and output layer, allowing the algorithm to use multiple processing layers, which may include multiple linear and non-linear transformations. Modern neural networks typically work with a few thousand to a few million neural units and millions of connections. Neural networks may have various suitable architectures and/or configurations known in the art.

There are many variants of neural networks with deep architecture depending on the probability specification and network architecture, including, inter alia, deep belief networks (DBN), restricted Boltzmann machines (RBM), random forests, and autoencoders. Implementations of neural networks may vary depending on the size of input data, the number of features to be analyzed, and the nature of the problem. Other layers may be included in the deep learning module besides the neural networks disclosed herein.

Another type of deep neural network may be a convolutional neural network (CNN), which can be used for analysis of an entity or process. CNNs are commonly composed of layers of different types: convolution, pooling, upscaling, and fully connected layers. In some cases, an activation function such as a rectified linear unit (ReLU) function may be used in some of the layers. In a CNN architecture, there can be one or more layers for each type of operation performed. A CNN architecture may include any number of layers in total, and any number of layers for the different types of operations performed. The simplest CNN architecture starts with an input layer followed by a sequence of convolutional layers and pooling layers (e.g., layers otherwise configured for reducing the dimensionality of the feature map generated by the one or more convolutional layers while retaining the most important features, for example, max pooling layers) and ends with fully connected layers (e.g., a layer in which each of the nodes is connected to each of the nodes in the previous layer). Each convolution layer may include a plurality of parameters used for performing the convolution operations. Each convolution layer may also include one or more filters, which in turn may include one or more weighting factors or other adjustable parameters. In some instances, the parameters may include biases (e.g., parameters that permit an activation function to be shifted). In some cases, the convolutional layers may be followed by an ReLU activation function layer. Other activation functions can also be used, for example, inter alia, saturating hyperbolic tangent, identity, binary step, logistic, arctan, softsign, parametric rectified linear unit, exponential linear unit, softPlus, bent identity, softExponential, Sinusoid, Sinc, Gaussian, or sigmoid functions. The convolutional, pooling and ReLU layers may function as learnable feature extractors, while the fully connected layers may function as machine learning classifiers. As with other artificial neural networks, the convolutional layers and fully connected layers of CNN architectures may include various computational parameters, for example, weights, bias values, and threshold values, which may be trained in a training phase.

Another type of deep neural network may be a visual geometry group (VGG) network. For example, VGG networks may be created by increasing the number of convolutional layers while fixing other parameters of the architecture. Adding convolutional layers to increase depth may be made possible by using substantially small convolutional filters in all of the layers. VGG networks may also include convolutional layers followed by fully connected layers.

Another type of deep neural network may be a deep residual network. Like some other networks described herein, a deep residual network may include convolutional layers followed by fully connected layers, which may be, in combination, configured and trained for feature property extraction. A deep residual network's layers may be config-ured to learn residual functions with reference to layer inputs, instead of learning unreferenced functions. Instead of relying on a direct fit of few stacked layers to a desired underlying mapping, a deep residual network's layers may be explicitly allowed to fit a residual mapping, which may be realized by feedforward neural networks having shortcut connections (i.e., connections that skip one or more layers). A deep residual network may be created by inserting short-cut connections into a plain neural network structure includ-ing convolutional layers, thereby modifying the plain neural network into a residual learning network.

In some implementations, the machine learning module may include a support vector machine (SVM), an artificial neural network (ANN), a decision tree-based expert learning system, an autoencoder, a clustering machine learning algo-rithm, or a nearest neighbor (e.g., kNN) machine learning algorithm, or combinations thereof, some of which will be described in further detail below.

Support vector machines (SVMs) may be supervised learning algorithms used for classification and regression analysis of entity classification data or process control. Given a set of training data examples (e.g., entity or process data), each marked as belonging to a category, an SVM training algorithm may build a model that assigns new examples (e.g., data from a new entity or process) to a given category.

Figure 5:
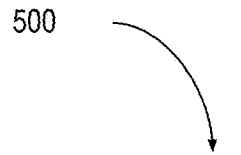
FIG. 5 illustrates an artificial neural network (ANN), according to one or more implementations herein.
Figure 5:
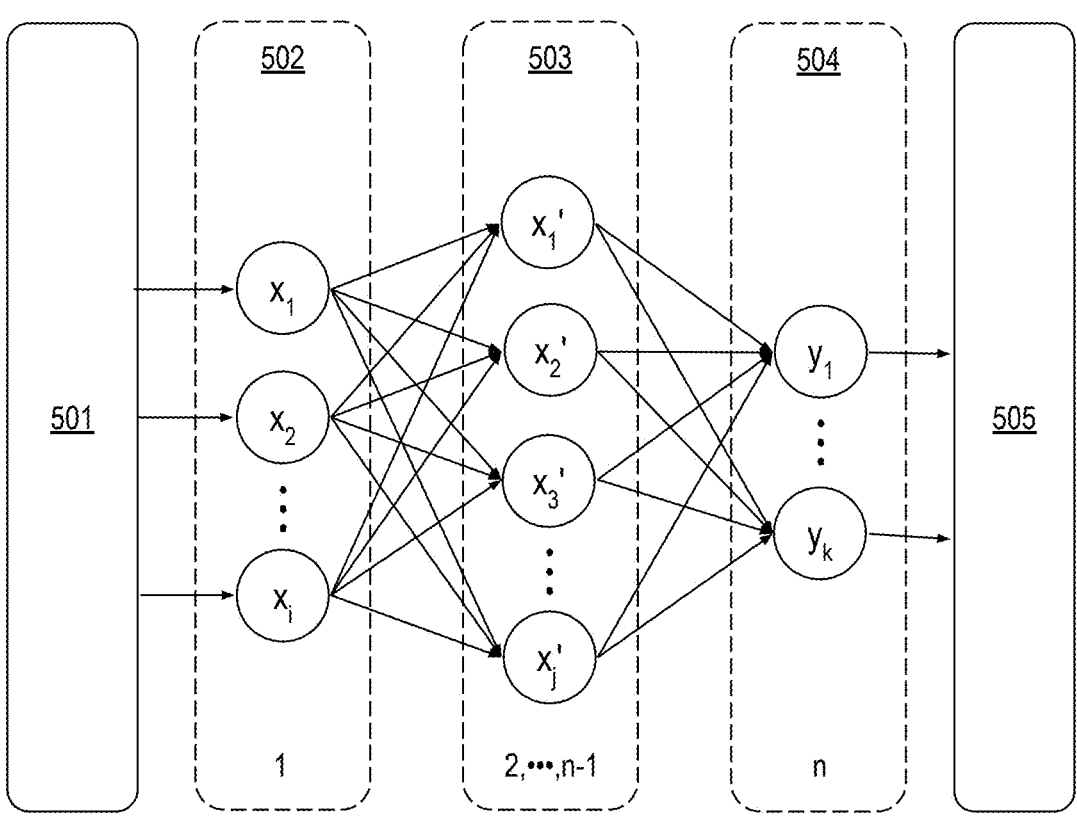

FIG. 5 illustrates an artificial neural network (ANN) 500, according to one or more implementations herein. ANN 500 may be used for, inter alia, classification or process control optimization according to various implementations.

ANN 500 may include any type of neural network mod-ule, such as, inter alia, a feedforward neural network, radial basis function network, recurrent neural network, or convo-lutional neural network.

In implementations implementing ANN 500 for entity classification, ANN 500 may be employed to map entity data to entity classification data. In implementations implement-ing ANN 500 for process optimization, ANN 500 may be employed to determine an optimal set or sequence of process control parameter settings for adaptive control of a process in real-time based on a stream of process monitoring data and/or entity classification data provided by, for example, observation or from one or more sensors. ANN 500 may include an untrained ANN, a trained ANN, pre-trained ANN, a continuously updated ANN (e.g., an ANN utilizing train-ing data that is continuously updated with real time classi-fication data or process control and monitoring data from a single local system, from a plurality of local systems, or from a plurality of geographically distributed systems).

ANN 500 may include interconnected nodes (e.g., $x_1$-$x_i$, $x_1'$-$x_j'$, and $y_1$-$y_k$) organized into n layers of nodes, where $x_1$-$x_i$ represents a group of i nodes in an input layer 502 (e.g., layer 1), $x_1'$-$x_j'$ represents a group of j nodes in one or more hidden layers 503 (e.g., layer(s) 2 through n−1), and $y_1$-$y_k$ represents a group of k nodes in a final layer 504 (e.g., layer n). Input layer 502 may be configured to receive input data 501 (e.g., sensor data, image data, sound data, observed data, automatically retrieved data, manually input data, etc.). Final layer 504 may be configured to provide result data 505.

There may be one or more hidden layers 503, and the number j of nodes in the one or more hidden layers 503 may vary from implementation to implementation. Thus, ANN 500 may include any total number of layers (e.g., the one or more hidden layers 503). One or more of the hidden layers 503 may function as trainable feature extractors, which may allow mapping of input data 501 to preferred result data 505.

FIG. 6 illustrates a node 600, according to one or more implementations herein. Each layer of a neural network may include one or more nodes similar to node 600, for example, nodes $x_1$-$x_j$, $x_1'$-$x_j'$, and $y_1$-$y_k$ depicted in FIG. 5. Each node may be analogous to a biological neuron.

Node 600 may receive node inputs 601 (e.g., $a_1$-$a_n$) either directly from the ANN's input data (e.g., input data 501) or from the output of one or more nodes in a different layer or the same layer. With node inputs 601, the node 600 may perform an operation 603, which while depicted in FIG. 6 as a summation operation, would be readily understood to include various other operations known in the art.

In some cases, node inputs 601 may be associated with one or more weights 602 (e.g., $w_1$-$w_n$), which may represent weighting factors. For example, operation 603 may sum the products of each of node inputs 601 and associated weights 602 (e.g., $a_i w_i$).

The result of operation 603 may be offset with one or more biases 604 (e.g., bias b), which may be a value or a function.

Output 606 of node 600 may be gated using an activation (or threshold) function 605 (e.g., function f), which may be a linear or a nonlinear function. Activation function 605 may be, for example, a ReLU activation function or other func-tion such as a saturating hyperbolic tangent, identity, binary step, logistic, arctan, softsign, parametric rectified linear unit, exponential linear unit, softPlus, bent identity, softEx-ponential, Sinusoid, Sinc, Gaussian, or sigmoid function, or any combination thereof.

Weights 602, biases 604, or threshold values of activation function 605, or other computational parameters of the neural network, can be "taught" or "learned" in a training phase using one or more sets of training data. For example, the parameters may be trained using input data from a training data set and a gradient descent or backward propa-gation method so that the output value(s) (e.g., a set of predicted adjustments to classification or process control parameter settings) computed by the ANN may be consistent with the examples included in the training data set. The parameters may be obtained, for example, from a back propagation neural network training process, which may or may not be performed using the same hardware as that used for automated classification or adaptive, real-time deposition process control. Decision tree-based expert systems may be supervised learning algorithms designed to solve entity classification problems or process control problems by applying a series of conditional (e.g., if-then) rules. Expert systems may include two subsystems: an inference engine and a knowledge base. The knowledge base may include a set of facts (e.g., a training data set including entity data for a series of entities, and the associated entity classification data provided by, for example, a skilled operator, technician, or inspector) and derived rules (e.g., derived entity classi-fication rules). The inference engine may then apply the rules to input data for a current entity classification problem or process control problem to determine a classification of the entity or a next set of process control adjustments.

Autoencoders (also sometimes referred to as an auto-associator or Diabolo network), may be an ANN used for unsupervised and efficient mapping of input data (e.g., entity data or process data), to an output value (e.g., an entity classification or optimized process control parameters). Autoencoders may be used for the purpose of dimensionality reduction, that is, a process of reducing the number of random variables under consideration by deducing a set of principal component variables. Dimensionality reduction may be performed, for example, for the purpose of feature selection (e.g., selecting a subset of the original variables) or feature extraction (e.g., transforming of data in a high-dimensional space to a space of fewer dimensions).

FIG. 7 illustrates a method 700 of training a machine learning model of a machine learning module, according to one or more implementations. Use of method 700 may provide for use of training data to train a machine learning model for concurrent or later use.

At 701, a machine learning model including one or more machine learning algorithms may be provided.

At 702, training data may be provided. Training data may include one or more of process simulation data, process characterization data, in-process or post-process inspection data (including inspection data provided by a skilled operator and/or inspection data provided by any of a variety of automated inspection tools), or any combination thereof, for past processes that are the same as or different from that of the current process. One or more sets of training data may be used to train the machine learning algorithm used for object defect detection and classification. In some cases, the type of data included in the training data set may vary depending on the specific type of machine learning algorithm employed.

At 703, the machine learning model may be trained using the training data. For example, training the model may include inputting the training data to the machine learning model and modifying one or more parameters of the model until the output of the model is the same as (or substantially the same as) external validation data. Model training may generate one or more trained models. One or more trained models may be selected for further validation or deployment, which may be performed using validation data. The results produced by each trained model for the validation data input to the training model may be compared to the validation data to determine which of the models is the best model. For example, the trained model that produces results most closely matching the validation data may be selected as the best model. Test data may then be used to evaluate the selected model. The selected model may also be sent to model deployment in which the best model may be sent to the processor for use in a post-training mode.

FIG. 8 illustrates a method 800 of analyzing input data using a machine learning module, according to one or more implementations herein. Use of the machine learning module described by method 800 may enable, for example, automatic classification of an entity or optimized process control.

At 801, a trained machine learning model of a machine learning module may be provided. The trained machine learning model may have been trained, or under continuous or periodic training by one or more other systems or methods. The machine learning model may be pre-generated and trained, enabling functionality of the module as described herein, which can then be used to perform one or more post-training functions of the machine learning module.

For example, the provided trained machine learning model may be similar to ANN 500, include nodes similar to node 600, and may have been trained (or be under continuous or periodic training) using a method similar to method 700.

At 802, input data may be provided to the machine learning module for input into the machine learning model. The input data may result from or be derived from a variety of different sources, similar to input data 501.

The provision of input data at 802 may further include removing noise from the data prior to providing it to the machine learning algorithm. Examples of data processing algorithms suitable for use in removing noise from the input data may include, inter alia, signal averaging algorithms, smoothing filter algorithms, Kalman filter algorithms, non-linear filter algorithms, total variation minimization algorithms, or any combination thereof.

The provision of input data at 802 may further include subtraction of a reference data set from the input data to increase contrast between aspects of interest of an entity or process and those not of interest, thereby facilitating classification or process control optimization. For example, a reference data set may include input data for a real or contrived ideal example of the entity or process. If an image sensor or machine vision system is used for entity observation, the reference data set may include an image or set of images (e.g., representing different views) of an ideal entity.

At 803, the machine learning module may process the input data using the trained machine learning model to yield results from the machine learning module. Such results may include, for example, an entity classification or one or more optimized process control parameters.

The invention is limited only by the appended claims. Variations, characteristics, advantages, implementations, constructions, arrangements, terminology, materials, dimensions, embodiments, illustrations, depictions, and examples composing the above description and accompanying drawings show some possible implementations of the invention without limiting the invention. It is not necessary that every implementation of the invention achieve or possess every advantage, purpose, or characteristic identified herein, and as such, one skilled in the art may effect various additions, changes, modifications, or omissions without departing from the scope or spirit of the invention or its legal equivalents.

All ranges are inclusive of the stated limits, the orders of magnitude thereof, and all values and ranges substantially therebetween unless otherwise defined. Unless otherwise stated, every use of "and" forms an inclusive list comprising at least the conjoined elements, and every use of "or" forms an inclusive list comprising at least one element of conjoined elements. Unless otherwise stated, singular usage (e.g., 'a', 'an', or 'the') includes plurals of the same.

The order of recitations in a claim do not imply a temporal or ordered relationship unless unavoidable by the plain language of that claim. No claim may be interpreted to invoke 35 U.S.C. § 112(f) unless that claim recites "means for" or "step for."

I claim:
1. A method for autonomously determining and acting on an inferred intent unstated by a user, comprising:
   receiving, at a processor, a user activity; and
   by the processor:
      determining the inferred intent based on the user activity and user registry data provided from a database stored in a memory in electronic communication with the processor, wherein the user registry data includes an autonomy authorization level and the inferred intent is unstated in the user activity and the user registry data;
      storing the inferred intent in the user registry data;
      generating an implementation plan based on the inferred intent and including a task;
      automatically executing the task asynchronously to the user activity if the task does not exceed the autonomy authorization level;
      generating a status of the implementation plan including a completion state of the implementation plan; and transmitting the status of the implementation plan to a user device.

2. The method of claim 1, wherein the user activity includes a user prompt, a user feedback, or a scheduled trigger.

3. The method of claim 1, wherein receiving the user activity includes receiving a request from a distinct system.

4. The method of claim 1, wherein the determining the inferred intent is using a trained machine learning model.

5. The method of claim 1, further comprising:

generating, by the processor, a research roadmap based on the inferred intent; and executing, by the processor, the research roadmap to yield a response;

wherein the generating the implementation plan is further based on the response.

6. The method of claim 5, wherein the generating the research roadmap is using a trained machine learning model.

7. The method of claim 5, wherein executing the research roadmap includes retrieving website data from a website.

8. The method of claim 1, wherein the generating the implementation plan is using a trained machine learning model.

9. The method of claim 1, wherein the processor comprises one or more physical processors, each of the one or more physical processors composing a computing platform.

10. The method of claim 1, wherein the registry data includes a user name, a business name, an industry, a description of an ideal customer, a description of a product offering, a differentiation factor, a website link, a social media handle, a history of user activity, a history of user-stated intents, a history of inferred intents, a history of user feedback, a system setting, a system conversation history, or an instruction or information proactively saved by the system as reference for future use.

11. The method of claim 1, wherein the transmitting the status of the implementation plan is via an electronic mail, a display corresponding to an application running on the user device, or a push notification.

12. The method of claim 1, further comprising, if the task exceeds the autonomy authorization level, by the processor:

generating an authorization request, wherein the implementation plan includes the authorization request and the processor is configured to automatically execute the task asynchronously to the user activity upon receipt of an instruction for the processor to perform the task in response to the authorization request;

generating a suggested action for the user to undertake, wherein the implementation plan includes the suggested action; or adjusting the implementation plan to exclude the task.

13. A system for autonomously determining and acting on an inferred intent unstated by a user, comprising:

a processor of an application server; and a memory in electronic communication with the processor, the memory having a database stored thereon;

wherein the processor is configured to:

receive a user activity;

determine the inferred intent based on the user activity and user registry data provided from the database, wherein the user registry data includes an autonomy authorization level and the inferred intent is unstated in the user activity and the user registry data;

store the inferred intent in the user registry data;

generate an implementation plan based on the inferred intent and including a task;

automatically execute the task asynchronously to the user activity if the task does not exceed the autonomy authorization level;

generate a status of the implementation plan including a completion state of the implementation plan; and transmit the status of the implementation plan to a user device.

14. The system of claim 13, wherein the determining the inferred intent is using a trained machine learning model.

15. The system of claim 13, wherein the processor is further configured to:

generate a research roadmap based on the inferred intent; and execute the research roadmap to yield a response;

wherein the generating the implementation plan is further based on the response.

16. The system of claim 15, wherein the generating a research roadmap is using a trained machine learning model.

17. The system of claim 13, wherein the generating the implementation plan is using a trained machine learning model.

18. The system of claim 13, wherein the processor comprises one or more physical processors, each of the one or more physical processors composing a computing platform.

19. A tangible, non-transitory, computer-readable medium having instructions thereupon which when implemented by a processor cause the processor to perform a method for autonomously determining and acting on an inferred intent unstated by a user, comprising:

receiving a user activity;

determining the inferred intent based on the user activity and user registry data provided from a database stored in a memory in electronic communication with the processor, wherein the user registry data includes an autonomy authorization level and the inferred intent is unstated in the user activity and the user registry data;

storing the inferred intent in the user registry data;

generating an implementation plan based on the inferred intent and including a task;

automatically executing the task asynchronously to the user activity if the task does not exceed the autonomy authorization level;

generating a status of the implementation plan including a completion state of the implementation plan; and transmitting the status of the implementation plan to a user device.

20. The method of claim 1, further comprising determining an off peak compute demand time of the processor, wherein one or more of the determining the inferred intent, the generating the implementation plan, or the automatically executing the task is deferred to the off peak compute demand time of the processor.

* * * * *